Dec. 29, 1953 H. HURVITZ 2,664,243

AUTO CORRELATION

Filed Feb. 6, 1950 2 Sheets-Sheet 1

INVENTOR

Hyman Hurvitz

INVENTOR
Hyman Hurvitz

UNITED STATES PATENT OFFICE 2,664,243

AUTOCORRELATION

Hyman Hurvitz, Washington, D. C.

Application February 6, 1950, Serial No. 142,647

19 Claims. (Cl. 235—61)

The present invention relates generally to devices for deriving signals corresponding with mathematical functions of other signals, and more particularly to devices for obtaining the auto-correlation function of a given signal, or the cross correlation function of a pair of signals.

It is well known that the auto-correlation function of a given signal, when passed through a Fourier integrator, provides a power spectrum of the signal. It is further known that signals which are time functions, and which correspond with auto-correlation or cross correlation functions of a given signal or signals, the latter representing further time functions, have many uses in the art of communication, the word "communication" being given its broadest meaning. Derivation of the auto-correlation and cross correlation functions of time varying signals is of primary importance in the field of the statistical theory of communications.

Briefly, in order to derive the auto-correlation function of a signal, the signal is applied to means which introduces a series of delays into the signal, and the original signal is mutiplied by its own delayed values. If the *n*th delay be $\tau_n$, then the product of the original signal after it has suffered any predetermined delay $\tau_n$, may be represented as $$V_n = f_1(t) \cdot f_1(t+\tau_n)$$

If the output of each multiplier is applied to a separate integrator and there averaged, we have for each integrator output the value $$\varphi_n = k\int_{-T}^{T} f_1(t) f_1(t+\tau_n) dt$$

which is, in the limit as T approaches infinity, the auto-correlation function.

Devices for producing auto-correlation functions of given time functions are known in the art. In one such device a multi-section tapped delay line is used, whose input feeds one input lead of each of a group of electron multipliers, each tap on the delay line being connected to the other input lead of a different one of the multipliers. The output of the *n*th multiplier is, therefore, $$\varphi_n = \frac{1}{2T} f_1(t) f_1(t+\tau_n)$$

where $f_1(t)$ is the signal and $\tau_n$ is the delay produced between the input of the delay line and the *n*th tap. The output of each multiplier may be led to an integrator and there averaged, the integrator being constituted of electrical components such as condensers and resistors. Each integrator output will then be $$\varphi_n = \frac{1}{2T}\int_{-T}^{T} f_1(t) f_1(t+\tau_n) dt$$

which is, in the limit as T approaches infinity, the auto-correlation function. In practice, if T is very much greater than $\tau_n$, as will usually be the case, the last equation will be a very good approximation to the actual auto-correlation function. If we scan the outputs of the integrator, we have $\phi$ as a time varying function. If desired, the function $\phi$ may be passed through a Fourier integrator, which will in response to $\phi_\tau$ produce the Fourier power series of the original signal. However, many other uses may be found for the auto-correlation function, as such, or considered as a function of time.

The difficulty with the devices of the prior art for producing the auto-correlation function involves principally the fact that the equipment required is extremely complex, if a considerable number of delays $\tau_n$ are to be employed. Additionally, it will be obvious that only discrete values of $\tau_n$ can be obtained and accordingly that the integral, which ideally corresponds with a value of the auto-correlation function, is actually an approximate integral, by reason of the finite delay times utilized.

It is accordingly desirable to produce a device for generating the auto-correlation function as a time function by means of relatively simple apparatus, preferably by means of apparatus which does not involve finite delay intervals, or at least relatively large discrete values of $\tau_n$, nor a large number of electronic tubes.

In accordance with the present invention the signal whose auto-correlation function is to be obtained as a time function is applied to a supersonic light valve of the type disclosed in U. S. Patent #2,451,465 issued to Harold L. Barney, October 19, 1948, or to the type disclosed in U. S. Patent #2,287,587 to G. W. Willard, issued June 23, 1942. As is well understood in the art, a wave of compressions and rarefactions passes through the liquid of the super-sonic valve in response to an electrical signal, and means are provided for absorbing the waves at the other end of the filter so that no reflections occur.

In accordance with one simple embodiment of the present invention a narrow beam of light is passed through the delay line at a point adjacent to the signal input thereto, so that the beam of light becomes modulated in intensity substantially in accordance with the signal wave form, and with substantially no delay. The narrow beam of light is then reflected back through the super-sonic delay line as a wide beam of light, encompassing substantially the entire super-sonic cell, and is again modulated in its passage through the cell. Each element or ray of the wide angle beam, however, is differently modulated, or is modulated only after a delay caused by the time required for the signal to travel to the point in the super-sonic delay line where the ray passes. Accordingly, at each point along the delay line the intensity of the light passing through is proportional to $$f_1(t)f_1(t+\tau_n)$$

where $\tau_n$ does not involve one of a plurality of discrete delays, but involves a delay which is continuous along the super-sonic cell. Accordingly, the wide angle light beam as it passes out of the cell represents a true auto-correlation function, subject to integration, each point along the beam having a different delay, and the time interval between adjacent delays being infinitesimally small. It is necessary to perform an integration in order to obtain the desired function. This may be accomplished by means of an iconoscope, the light responsive and photo-emissive mosaic of which is interposed in the path of the beam. It is well known that an iconoscope is a storage device. Accordingly, there will be stored at each point along the photo-sensitive surface of the iconoscope a voltage representative of the integrated value of that ray of the light beam which strikes that portion of the photo-emissive surface. There is produced on the photo-emissive surface of the iconoscope, then, a true picture of the auto-correlation function $\phi$. In order to obtain $\phi$ as a time function, it is necessary merely to scan the photo-emissive surface of the iconoscope by means of an electron beam, in accordance with known technique, the voltage output of the iconoscope being then a time function corresponding with the auto-correlation function.

By variations of the described techniques cross correlation functions may also be derived, as will appear as the description proceeds.

It is, accordingly, a broad object of the present invention to provide a novel device for generating the auto-correlation function of any signal or the cross correlation function of two signals.

It is a further broad object of the present invention to provide a novel device for generating an auto-correlation function or a cross correlation function as a time varying function, in response to a given electrical signal.

It is still a further object of the invention to generate auto-correlation and cross correlation functions by means of super-sonic light valves.

More broadly stated it is an object of the present invention to provide apparatus for generating the auto-correlation function of a signal or the cross correlation function of two signals by means of optical apparatus.

The above and still further features and objects of the invention will become apparent upon consideration of the following detailed description of a specific embodiment of the invention, especially when taken in conjunction with the accompanying drawings wherein.

Figure 1:
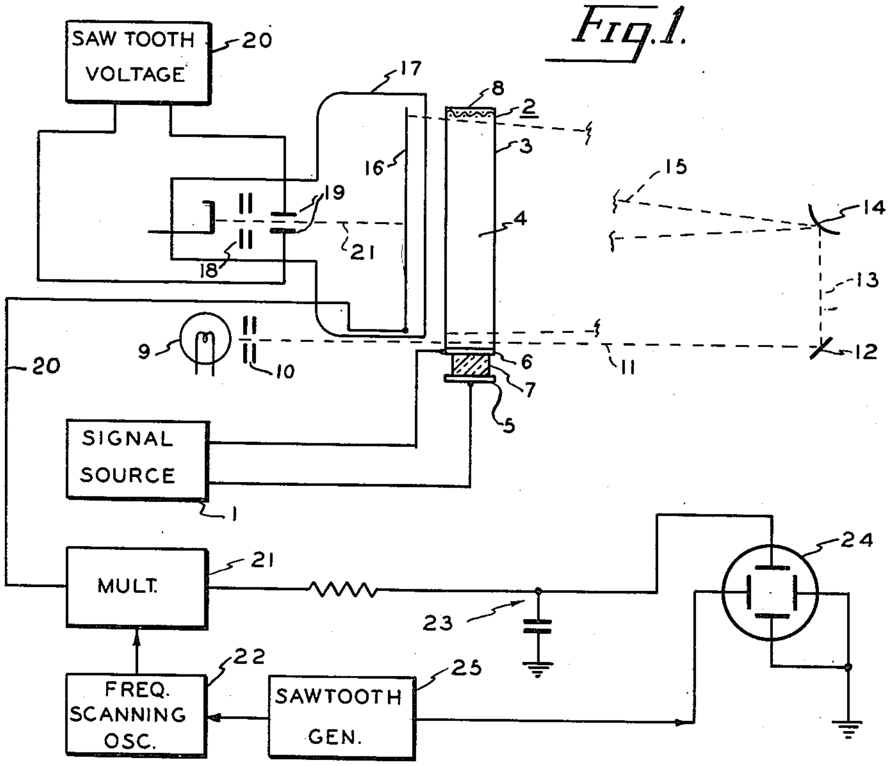
Figure 1 is a schematic diagram of an apparatus for generating the auto-correlation function of a signal, for storing that function, and for translating that function into a time varying function.

Referring now more specifically to the drawings, the reference numeral 1 represents a signal source in response to which is to be generated the auto-correlation function of the signal provided by the signal source. The signal provided by the source 1 is applied to a supersonic light valve 2 which comprises a container 3, within which is liquid 4. Secured to one end of the cell is an outer-electrode 5, an inner-electrode 6, and a quartz electrical crystal element 7 interposed between the electrodes 5 and 6. Signal from the signal source 1 is applied across the electrodes 5 and 6, which causes vibration of the quartz crystal 7. The vibrations of the crystal 7 are then transferred to the liquid 4 in the cell 2, causing vibrations, which set up waves in the liquid medium 4, such as water, which fills the container 3. The resulting condensations and rarefactions progress longitudinally to the far end of the cell, where they are absorbed by layers of wire mesh 8, or other devices designed to prevent reflection, such as are more fully described in the patent to Willard, supra. A source of light 9 is provided which passes through slits 10, which form a narrow beam of light 11 at their output. The narrow beam of light 11 passes through the cell 4 adjacent to the electrode 6, and accordingly, the light beam 11 is modulated in intensity in accordance with the intensity of the signal provided by the signal source 1. This occurs substantially without delay, since the light beam 11 passes through the cell 4 at a point quite close to the electrode 6. The light beam 11, after it has passed through the cell 4, is directed to a mirror 12, which is set at an angle of 45° with respect to the beam 11, and which, accordingly, directs the beam 11 upwardly, as a beam 13. The beam 13 is directed to a further mirror 14, which is set generally at an angle of 45° to the beam 13, but which is rounded sufficiently, with its convex surface directed toward the beam 13, so that the beam 13 is spread out into a sufficiently wide beam 15, or into a multiplicity of divergent rays. The beam 15 passes back through the cell 4, a ray of the beam 15 passing through each infinitesimal element of the cell 2. Obviously, the beam 15 will contain all the intensity modulations which were contained in the beam 11, but in passing through the cell 2 will be further modulated in response to the condensations and rarefactions of the liquid medium 4 of the cell, so that the beam 15 as it emerges from the cell 2, has suffered, in series, two intensity modulations. One of these is representative of the original source 1 without any delay $\tau$, while the other is representative of the signal source 1 after it has been delayed by the cell 4. Each elementary ray of light comprising the beam 15 will be differently modulated in its passage through the cell 2, and the difference will correspond with a different delay time $\tau$.

The beam 15, after it has passed through the cell 2, is impressed on the photo-electric surface 16 of an iconoscope 17, the latter having the usual beam forming elements 18, and a pair of deflecting electrodes 19. To the latter is applied a saw-tooth deflection voltage from a source 20, so that the beam 21 of the iconoscope 17 is caused to scan the photo-electric surface 16.

It is well known that the photo-electric surface of an iconoscope is a storage device, and stores light, or integrates the intensity of light at each point thereof, until that point is impinged on by the scanning electron beam of the iconoscope, so that at each point is stored an auto-correlation function for a delay time $\tau_n$. The output voltage available from the photo-electric surface 16, as it is scanned by the electron beam 21, and which appears on the lead 20, represents then the auto-correlation function of the signal provided by the signal source 1, as a time function.

Various modes of utilization of the auto-correlation function may be envisaged. In particular the auto-correlation function may be transformed into a Fourier power series by operation on the auto-correlation function by a Fourier transform. More specifically this may be accomplished by applying the voltage corresponding with the auto-correlation function to a multiplier 21, and in applying to the multiplier further a voltage at any given frequency from an oscillator 22. The output of the multiplier 21 may then be integrated in an integrating circuit 23, across which will appear the Fourier power component corresponding with the frequency supplied by the oscillator 22. If the oscillator 22 be caused to scan slowly the voltage on the integrator 23 will vary, representing at each frequency of the scanning oscillator 22 the amplitude of the frequency component corresponding with the then frequency of the oscillator, as it is developed from the voltage corresponding with the auto-correlation function, applied to the input of the multiplier 21 on the lead 13. If then the voltage across the integrating circuit 23 be applied to the vertical deflection electrodes of a cathode ray tube indicator 24 while a horizontal scanning voltage be developed which is proportional to the frequency of the scanning oscillator at each instant, by means of a saw-tooth generator 25, there will be presented on the face of the indicator 24 the Fourier power series corresponding with the voltage provided by the signal source 1.

The concept of transforming an auto-correlation function into a power series by means of the circuit having components identified by the reference numerals 21 to 25 inclusive, is not novel, and forms no part of the present invention, per se.

Figure 2:
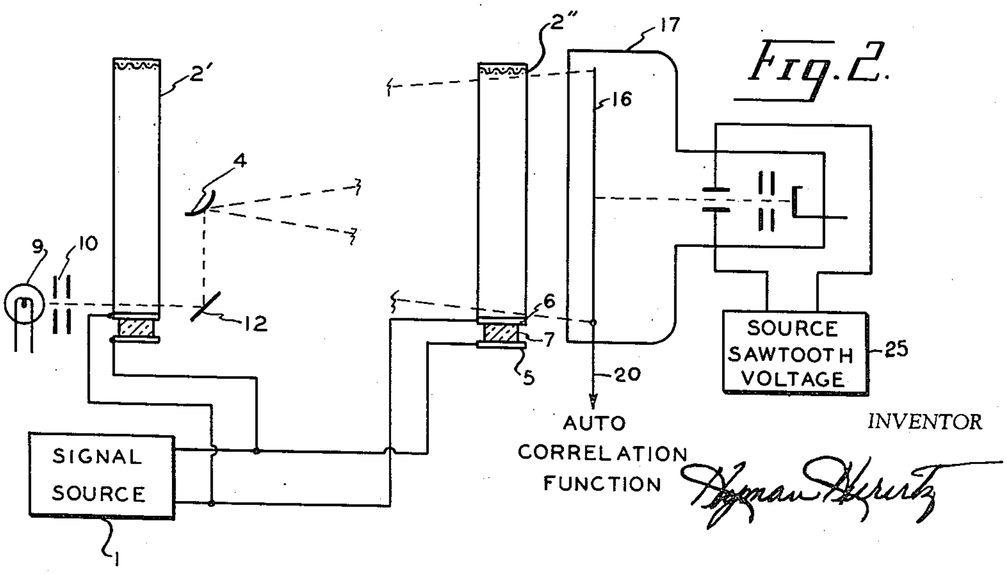
Figure 2 is a modification of the system of Figure 1 which utilizes two super-sonic light valves.

Reference is now made to Figure 2 of the accompanying drawings wherein is illustrated a modification of the system of Figure 1, employing two super-sonic light valves, the first of which is 2′ and the second of which is 2″. The output of a signal source 1 is applied to both super-sonic cells 2′ and 2″, simultaneously. Light from a source 9 is applied through slits 10 to the cell 2′ adjacent to its input end. Light emerging from the cell 2′ is deflected at an angle of 90° by means of a mirror 12, then spread by means of a curve mirror 14, and applied to the second cell 2″ as a wide angle beam. The output of light from the second cell is then applied to an iconoscope 17 as in Figure 1. Accordingly, the system of Figure 2 is identical in concept with that of Figure 1, except that two separate super-sonic cells are utilized, so that the narrow light beam which represents the voltage supplied by the signal source 1 without delay need not be transmitted back through the same photo-cell, but may be applied to a separate light cell for multiplication with the signal source 1 after delay.

In addition to the auto-correlation function, a further function which is of considerable value in the communications art, and in the art of analysis of electrical signals, is the cross correlation function, which may be defined by the expression $$\varphi_{12}(\tau)=\lim_{T\to\infty}\frac{1}{2T}\int_{-T}^{T}f_1(t)\,f_2(t+\tau)\,dt$$

It will be seen, then, that the cross correlation function is precisely similar to the auto-correlation function except that in deriving the cross correlation function, two separate and distinct functions are correlated, and the multiplication which takes place is not between a first function and that function after time delays $\tau$, but of a first function and a second function after certain time delays $\tau$.

Figure 3:
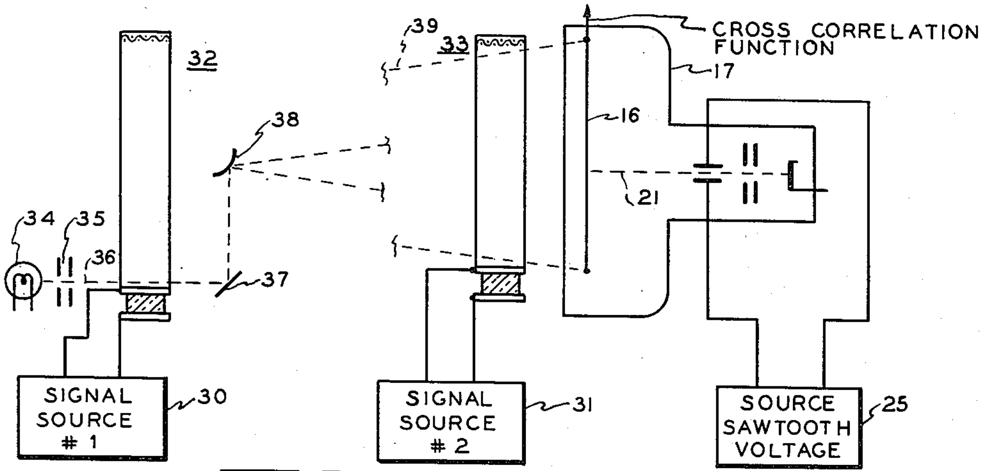
Figure 3 is a modification of the system of Figure 2 which is capable of deriving a cross correlation function.

Reference is made to Figure 3 of the accompanying drawings, for a structure which is capable of deriving a cross correlation function. Specifically, there are provided two sources of signals, 30 and 31, the two signals being distinct and different. Signal from the signal source 30 is applied to the input of a super-sonic light valve 32, while signal from the signal source 31 is applied to a separate super-sonic light valve 33. A beam of light from a source 34 passes through slits 35, which form a narrow beam 36, and the latter is passed through the cell 32 adjacent to the input end thereof, becoming modulated in accordance with the voltage provided by signal source 30 substantially without delay. The light beam 36 after emerging from the cell 32 is deflected through an angle of 90° by a mirror 37 and is then scattered by a curved mirror 38 to form a divergent light beam 39, which is passed through the super-sonic light valve 33, and then impinges on the photo-electric surface 16 of an iconoscope 17, as in the embodiment of the invention illustrated in Figures 1 and 2 of the drawings. It will be seen then that the light beam 36 which is impressed on the valve 33 is modulated in accordance with a first function $f_1(t)$, and that each element or ray of the divergent beam 39 as it passes through the cell 33 is further modulated by a second function $f_2(t+\tau)$, after the function $f_2(t)$ has suffered delay T in passing along the cell. Accordingly, each element or ray of the divergent light beam 39 represents the function $f_1(t)$ is multiplied by $f_2(t+\tau)$, $\tau$ having a different value for each ray in accordance with its angular position, or in accordance with its position of entry into the second super-sonic cell 33. There is, therefore, stored on the photo-electric surface 16 a cross correlation function, and the latter may be translated into a time function by the scanning action of the beam 21 of the iconoscope as in Figures 1 and 2 of the drawings.

Figures 4, 5:
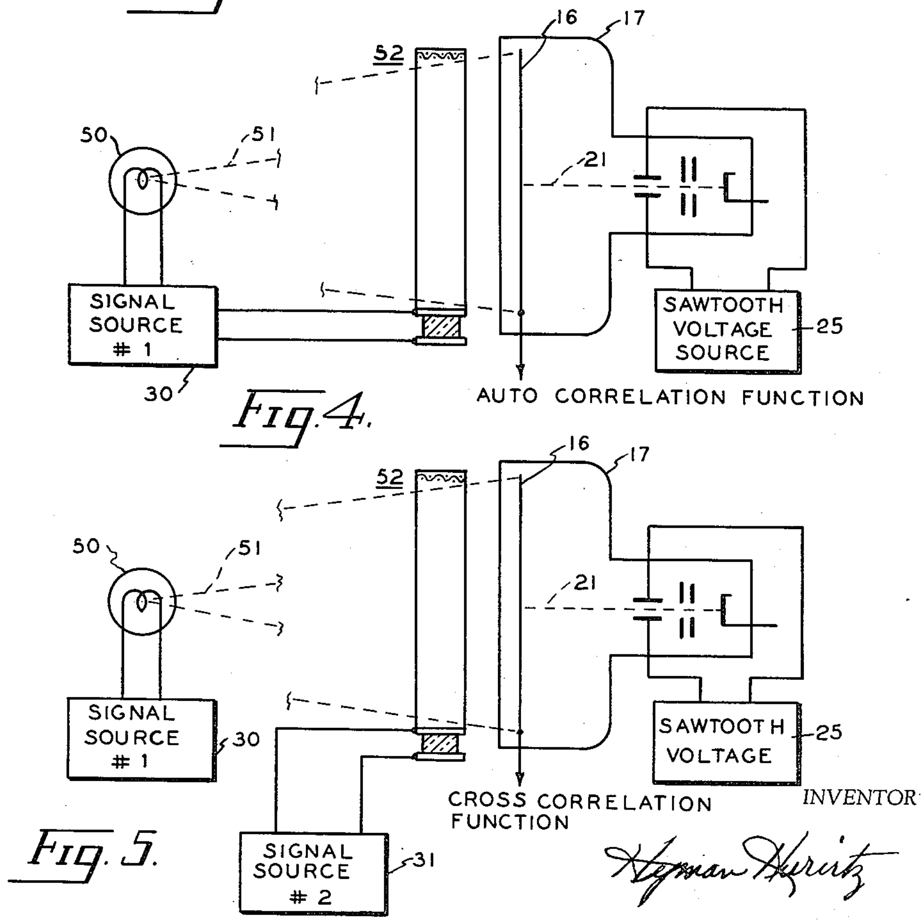
Figure 4 is a modification of the system of Figures 1 and 2 utilizing a directly modulated light source and a modulating light valve to produce the auto-correlation function.
Figure 5 is a modification of the system of Figure 3 utilizing a directly modulated light source and a modulating light valve to produce a cross modulation function.

Referring now more particularly to Figure 4 of the drawings, there is illustrated a light source 50, which is capable of modulation in response to a varying voltage. A large number of such light sources are known in the art, and, accordingly, the light source 15 has been conventionally illustrated, and no specific form of such a light source has been described or illustrated. The output of the light source 50 is a divergent beam of light 51, the amplitude of which at each instant represents the amplitude of the output of the signal source. Voltage from the signal source is applied further to the input of a supersonic light valve 52 and the latter accordingly modulates the light beam 51, so that the output of the light cell is $\phi_{11\tau}$, the auto-correlation function. The output of the supersonic light valve 52 is applied to the photo-electric surface 16 of iconoscope 17, and the latter upon being scanned by the electron beam 21 generates at its output terminal an auto-correlation function of the signal provided by the signal source 1.

In Figure 5 of the accompanying drawings is illustrated a system corresponding broadly with that of Figure 4, and which is capable of providing a cross correlation of two time functions represented by voltages provided by two signal sources. One of the signal sources is utilized to modulate the intensity of light emitted by a light source 50, while the other source is applied to the input of a super-sonic light valve 52, which modulates the divergent beam provided by the source 51. The output of the cell 52 is impressed on the photo-electric surface 16 of an iconoscope 17 and when the latter is scanned by the electron beam 21 there is provided at the output terminal of the iconoscope 17 a voltage corresponding with a cross relation function of the two voltage provided by the signal sources 1 and 2.

It is realized that in the various forms of my invention, a steady D.-C. output is available from the iconoscope in the absence of input signal, due to the fact that light is continuously applied through the super-sonic cells to the light-sensitive surface of the iconoscope. This fact in itself does not militate against the utility of the invention, since the steady D.-C. output may be balanced out by a counter-voltage in the output utilization circuit, or eliminated by suitable A.-C. coupling.

While I have disclosed various specific forms of the invention it will be clear that variations thereof may be resorted to without departing from the true scope of the invention as defined in the appended claims.

What I claim and desire to secure by Letters Patent of the United States is:

1. A system for deriving the auto-correlation function of a function $Ef(t)$, where E is a voltage, comprising, a supersonic light valve having an input means, means for applying $Ef(t)$ to said input means, means for generating a first narrow beam of light, means for passing said first beam of light through said super-sonic light valve adjacent said input means, means for transforming said first narrow beam of light to a further light beam having width of the order of the length of said super-sonic light valve, means for passing said further light beam through said super-sonic light valve to provide an emergent wide light beam, a photo-electric surface, and means for impressing said emergent wide light beam on said photo-electric surface for integration of light values of said emergent wide light beam over a time interval.

2. A system for developing a response corresponding with a correlation function of two varying signals $E_1f_1(t)$ and $E_2f_2(t+\tau)$, where $E_1$ and $E_2$ may be identical or different, and where $f_1(t)$ and $f_2(t)$ may be identical or different, and where $\tau$ is a delay time, comprising means for translating one of said varying signals, $E\,f_1(t)$ into an amplitude varying light beam, having amplitude variations proportional to $E_1f_1(t)$, means for transforming the other of said varying signals $E_2f_2(t)$ into rarefactions and compressions in a sonic light valve in accordance with a varying function $E_2f_2(t+\tau)$, where $\tau$ is different for different points in said light valves, means for passing said amplitude varying light beam through said sonic light valve in such manner as to generate a product function $$E_1f_1(t)E_2f_2(t+\tau)$$

$\tau$ assuming a plurality of values, and means for separately integrating said product function over a substantial time interval for each value of $\tau$.

3. A system for developing a response corresponding with the auto-correlation function $$\phi_{11\tau}=\lim_{T\to\infty}\frac{1}{2T}\int_{-T}^{T}f_1(t)f_1(t+\tau)dt$$

of a function $f_1(t)$, comprising, means for generating a light beam having a multiplicity of rays, means for modulating all said rays identically each to have amplitude variation representative of $f_1(t)$, means for generating rarefactions and compressions of a mechanical light modulating cell in accordance with the function $f_1(t+\tau)$, where $\tau$ is a delay time and has a different value for each different point along the cell, means for passing each ray of said light beam through a different portion of said light modulating cell to generate a further light beam having rays each representative of $f_1(t)f_1(t+\tau)$, with a different value of $\tau$ for each ray, and means for separately integrating the light intensities of each ray of said further light beam over a substantial time interval.

4. The combination in accordance with claim 3 wherein said means for integrating comprises a photo-sensitive mosaic.

5. The combination in accordance with claim 3 wherein is further provided means responsive to said means for integrating for generating a time function of $\tau$.

6. A system for generating a response corresponding with the cross-correlation function $$\phi_{12\tau}=\lim_{T\to\infty}\frac{1}{T}\int_{-T}^{T}f_1(t)f_2(t+\tau)dt$$

of two functions $f_1(t)$ and $f_2(t)$, comprising, means for generating a light beam having a multiplicity of rays, means for modulating said rays each to have amplitude variations representative of $f_1(t)$, means for generating rarefactions and compressions of a mechanical light modulating cell in accordance with the function of $f_2(t+\tau)$, where $\tau$ is a delay time different for each point along said cell, means for passing each ray of said light beam through a different portion of said light modulating cell to generate a further light beam having rays each representative in amplitude of the product $f_1(t)f_2(t+\tau)$, with a different value of $\tau$ for each ray, and means for separately integrating the light intensities of each ray of said further light beam over a substantial time interval.

7. The combination in accordance with claim 6 wherein said means for integrating is a photo-electric mosaic.

8. The combination in accordance with claim 6 wherein is further provided means responsive to said means for integrating for generating a time function of $\phi_{12}(\tau)$, said last means comprising means for electronically scanning said photo-electric mosaic.

9. A system for generating the auto-correlation function of $f_1(t)$ comprising, means for generating a light beam having a plurality of rays, means for identically modulating said rays each to have amplitude variations representative of $f_1(t)$, means for modulating the amplitude of each of said rays in accordance with the function $f_1(t+\tau)$, a different $\tau$ being assigned to each of said rays, and $\tau$ being a delay time, and means for integrating the amplitude of each of said rays over a substantial time period.

10. The combination in accordance with claim 9 wherein is further provided means responsive to said means for integrating for generating a time function corresponding with said auto-correlation function.

11. A system for generating a correlation function of $f_1(t)$ and $f_2(t)$, where $f_1(t)$ and $f_2(t)$ may be the same or different, comprising, means for generating a light beam having a plurality of rays, means for modulating said rays identically each to have amplitude variations representative of $f_1(t)$, where $f_1(t)$ is a time varying function, means for further modulating the amplitude of each of said rays in accordance with the function $f_2(t+\tau)$, where $f_2(t)$ is a time varying function, a different $\tau$ being assigned to each of said rays, and $\tau$ being a delay time and means for integrating the amplitude of each of said further amplitude modulated rays over a substantial time period.

12. The combination in accordance with claim 11 wherein is further provided means responsive to said means for integrating for generating a time function corresponding with said correlation function.

13. The combination in accordance with claim 11 wherein said means for integrating is a photo-sensitive light integrating mosaic, said rays each impinging on a different area of said surface.

14. The combination in accordance with claim 11 wherein said means for integrating is a photo-sensitive light integrating mosaic, said rays each impinging on a different area of said mosaic, and means for electronically scanning said mosaic to generate a time function corresponding to the time integrated values of each of said amplitude modulated rays.

15. A system for generating a correlation function of two time functions $f_1(t)$ and $f_2(t)$, which may be the same or different, comprising, amplitude modulating means for generating a physical quantity which defines the time function $f_1(t)$ as a continuous function of $t$, $f_1(t)$ being continuously variable and $t$ being time, amplitude modulating means for modulating the values of said physical quantity to generate a further physical quantity which defines the time function $f_1(t)f_2(t+\tau)$, where $\tau$ is a delay time, and where $f_2(t)$ is continuously variable, and where said further physical quantity is defined, over a range of values of $\tau$, for all values of $\tau$ within said range, and means for integrating the value of said further physical quantity over a predetermined time period for each of an infinite number of values of $\tau$.

16. In a device for performing mathematical operations, a source of signal wave having magnitude continuously varying as a function of time, modulating means for transforming said signal wave into a light beam having intensities as a function of distance taken transversely across said light beam corresponding with a function of the magnitude of said signal wave taken as a function of time, a photo-sensitive mosaic, means for impressing the modulated light beam on said mosaic in such manner that in course of time each different point of said mosaic integrates as an electric charge the intensity of said light beam at a different position taken transversely of said light beam, and means for successively discharging said electric charges from successive ones of the points of said mosaic into a common circuit, to generate a further signal wave which is a function of time.

17. A system for generating a mathematical function of a voltage $Ef(t)$, where $f(t)$ is continuously varying, comprising, modulating means responsive to said voltage for generating a light beam having a plurality of rays each having amplitude variations in accordance with a function $Ef(t+\tau)$, where $t$ is time and $\tau$ is a fixed delay time different for each of said beams, means for integrating the amplitude of each of said rays over a substantial time period, and further means responsive to said means for integrating for generating said mathematical function as a variable electrical signal.

18. The combination in accordance with claim 17 wherein said means for integrating is a photo-electric mosaic subjected at each separate point thereof to a different one of said rays.

19. The combination in accordance with claim 18 wherein said further means includes, a source of a beam of electrons, means for scanning said beam of electrons across said photo-electric mosaic, and means for deriving a variable electrical signal from said photo-electric mosaic in response to said scanning.

HYMAN HURVITZ.

References Cited in the file of this patent

UNITED STATES PATENTS

| Number | Name | Date |
|---|---|---|
| 2,024,900 | Wiener | Dec. 17, 1935 |
| 2,124,599 | Wiener | July 26, 1938 |
| 2,128,257 | Yuk-Wing Lee et al. | Aug. 30, 1938 |
| 2,270,232 | Rosenthal | Jan. 20, 1942 |
| 2,451,465 | Barney | Oct. 19, 1948 |
| 2,513,520 | Rosenthal | July 4, 1950 |
| 2,525,496 | McCann | Oct. 10, 1950 |

FOREIGN PATENTS

| Number | Country | Date |
|---|---|---|
| 486,896 | Great Britain | June 13, 1938 |

OTHER REFERENCES

Electronic Instruments, volume 21 of Radiation Laboratory Series; figure 4.19, page 78; library No. TK7870 G7.